US012028661B2

(12) United States Patent
Patronas et al.

(10) Patent No.: US 12,028,661 B2
(45) Date of Patent: Jul. 2, 2024

(54) SYNCHRONIZATION OF OPTICALLY SWITCHED NETWORKS (71) Applicant: Mellanox Technologies, Ltd., Yokneam (IL)

(72) Inventors: Ioannis (Giannis) Patronas, Athens (GR); Dotan David Levi, Kiryat Motzkin (IL); Wojciech Wasko, Pomeranian (PL); Paraskevas Bakopoulos, Ilior (GR); Dimitrios Syrivelis, Volos (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/869,932

(22) Filed: Jul. 21, 2022

(65) Prior Publication Data
US 2024/0015419 A1 Jan. 11, 2024

(30) Foreign Application Priority Data

Jul. 11, 2022 (GR) .............................. 20220100550

(51) Int. Cl.
H04B 10/2575 (2013.01)
H04B 10/40 (2013.01)
H04B 10/50 (2013.01)
H04B 10/60 (2013.01)
H04Q 11/00 (2006.01)

(52) U.S. Cl.
CPC ..... *H04Q 11/0005* (2013.01); *H04B 10/25753* (2013.01); *H04B 10/40* (2013.01); *H04B 10/50* (2013.01); *H04B 10/60* (2013.01); *H04Q 2011/0045* (2013.01); *H04Q 2011/005* (2013.01)

(58) Field of Classification Search
None
See application file for complete search history.

(56) References Cited

U.S. PATENT DOCUMENTS

5,107,490 A * 4/1992 Wilson ................. H04J 3/0614
370/452
6,483,620 B1 * 11/2002 Epworth ............ H04B 10/2569
398/154
10,778,406 B2 9/2020 Gaist
11,283,454 B2 3/2022 Ravid
(Continued)

*Primary Examiner* — Darren E Wolf
(74) *Attorney, Agent, or Firm* — Moore & Van Allen PLLC; Michael M. McCraw (57) ABSTRACT Network devices and associated methods are provided for synchronization in an optically switched network. The network device includes one or more ports in communication with a plurality of devices via an optical switch. The one or more ports receive a master clock signal having a first frequency from a first device of the plurality of devices. The network device includes a local clock in communication with the one or more ports and operating at a second frequency. The network device includes a synchronization manager in communication with the one or more ports and the local clock and configured to be enabled and disabled. When the synchronization manager is enabled, it receives the master clock signal via the one or more ports and transmits an instruction to the local clock to operate at the first frequency.

20 Claims, 7 Drawing Sheets (56) References Cited

U.S. PATENT DOCUMENTS

| | | | |
|---|---|---|---|
| 2001/0039635 A1* | 11/2001 | Chrudimsky | H03K 19/096 |
| | | | 714/726 |
| 2004/0028406 A1* | 2/2004 | Bortz | H04Q 11/0005 |
| | | | 398/49 |
| 2010/0221000 A1* | 9/2010 | Yang | H04B 10/272 |
| | | | 398/38 |
| 2020/0169975 A1* | 5/2020 | Kwon | H04W 56/001 |
| 2022/0191275 A1 | 6/2022 | Levi | |

* cited by examiner

SYNCHRONIZATION OF OPTICALLY SWITCHED NETWORKS

CROSS-REFERENCE TO RELATED APPLICATIONS

This application claims priority to Greek Patent Application No. 20220100550, filed Jul. 11, 2022, the entire contents of which application are hereby incorporated herein by reference.

TECHNOLOGICAL FIELD

Example embodiments of the present disclosure relate generally to optically switched networks and, more particularly, to the synchronization of optically switched networks using Synchronous Ethernet (SyncE).

BACKGROUND

Applicant has identified a number of deficiencies and problems associated with the synchronization of optically switched networks. Through applied effort, ingenuity, and innovation, many of these identified problems have been solved by developing solutions that are included in embodiments of the present disclosure, many examples of which are described in detail herein.

BRIEF SUMMARY

In order to solve these issues and others, embodiments of the present disclosure provide methods, network devices, and networks, for synchronization of optically switched networks. With reference to an example apparatus or device, an example network device may include one or more ports configured to be in communication with a plurality of devices via an optical switch. The one or more ports may be configured to receive a master clock signal having a first frequency from a first device of the plurality of devices. The network device may further include a local clock in communication with the one or more ports and operating at a second frequency and a synchronization manager in communication with the one or more ports and the local clock and configured to be enabled and disabled. When enabled, the synchronization manager may be configured to receive the master clock signal via the one or more ports and transmit an instruction to the local clock to operate at the first frequency.

In some embodiments, the synchronization manager may be configured to be enabled during a first time period.

In some embodiments, the synchronization manager may be configured to be disabled during a second time period.

In some further embodiments, during the second time period, the local clock may be configured to transmit a recovered clock signal to a second device of the plurality of devices via the one or more ports.

In some further embodiments, the local clock may operate at the first frequency during the second time period.

In some further embodiments, the master clock signal and the recovered clock signal may be transmitted in accordance with a Synchronous Ethernet standard.

In some further embodiments, the synchronization manager may be configured to be enabled during a third time period.

The above summary is provided merely for purposes of summarizing some example embodiments to provide a basic understanding of some aspects of the present disclosure.

Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Modern networks may include a large number of interconnected nodes (e.g., any electronic or optical devices, such as data processing units, computer processing units, electrical switches, optical switches, etc.). Many nodes in the network may include a clock that generates a clock signal. These clock signals may then be transmitted among the network nodes in order to carry out the functions of the nodes and/or network. As such, it is often critical that the clocks of each network node are synchronized in order for the nodes and the network as a whole to function properly. Synchronous Ethernet ("SyncE") is an International Telecommunication Union Telecommunication Standardization Sector ("ITU-T") standard that can be used to synchronize the clock of each node in the network through distribution of clock frequency information from a master clock or primary reference clock to network nodes. Since each node in the network relies on the master clock to ensure its local clock is synchronized, one of the key requirements for the proper functioning of SyncE is that each network node may reference (or trace back to) the master clock to obtain the correct synchronization information (e.g., from the master clock) so as to avoid obtaining synchronization information from nodes that are not synced to the master clock frequency.

In simple networks, each node may be directly connected to the master clock. In many complex networks, however, it is often impossible or impracticable for each node to be directly connected to the master clock. As a result, many networks have nodes (e.g., switches) that enable one node (e.g., the master clock) to be connected to the rest of the network nodes (e.g., data processing units) through only a few connections as opposed to each network node being connected to every other network node. In order to implement SyncE in such a network, the network may be organized into a tree-hierarchical structure with the master node at the top followed by expanding layers of nodes below the master node. For example, in an exemplary network, there may be two (2) switches connected to a master clock and four (4) data processing units connected to each switch. For synchronization purposes in such an exemplary network, each switch may track the frequency of the master clock (e.g., operate a slave node to the master clock) and then each data processing unit may track the frequency of the switch it is connected to (e.g., operate as a slave node to the switch), thus, enabling each node in the network to reference the master clock. Additionally, the tree-hierarchical structure ensures that each node is only a slave to one node in the network (e.g., from which it receives the master clock frequency) thus ensuring that the node is synchronizing to the master clock frequency and not to the frequency of a node that has not been synchronized to the master clock.

Although the tree-hierarchical structure may enable the implementation of SyncE in larger and more complex networks, such a structure is only possible if the network leverages electrical switches capable of implementing packet switching. For example, in order to route a packet from one node to another node in a network, an electrical switch performs packet switching in which packets are routed between nodes through permanent physical means (e.g., the electrical switch is permanently connected via a dedicated wire to each node in the network). As a result, in the example tree-hierarchical structure, an electrical switch may receive the master clock frequency from the master clock via a dedicated physical wire, and other nodes (e.g., nodes that operate as slaves to the electrical switch) may each receive the master clock frequency from the electrical switch via dedicated physical wires.

In networks that rely upon optical switches (e.g., slotted networks), however, it is not possible to implement SyncE using the tree-hierarchical network structure because optical switches are incapable of implementing packet switching. Instead, in order to route packets between network nodes, an optical switch may employ circuit switching. An example circuit switch approach used in slotted networks is the Time Division Multiple Access ("TDMA") approach. In the TDMA approach, a time period is divided into timeslots. In each timeslot, the optical switch may establish a dedicated connection between two nodes in the slotted network so that a packet may be routed directly between the two nodes. At the end of a timeslot, the connection between the two nodes may be broken and one or both of the nodes may be connected to other nodes in the slotted network. As a result, each node in the slotted network is dynamically connecting to different nodes that may or may not be the master clock node. This may result in nodes that synchronize their clocks to clocks of nodes that are not the master clock. Since these nodes are not able to consistently reference the master clock, conventional slotted networks of optical switches are incapable of using SyncE for clock synchronization.

To address these issues and others, embodiments of the present disclosure provide networks, systems, apparatuses, and methods for clock synchronization using SyncE in slotted networks. For example, in various embodiments, a slotted network is provided that includes a master device and one or more slave devices in communication with the master device via an optical switch. In some embodiments, the master device may include a master clock operating at a first frequency and configured to generate a master clock signal. In some embodiments, a first slave device of the one or more slave devices may include one or more ports configured to receive the master clock signal from the master device, a local clock in communication with the one or more ports and operating at a second frequency, and a synchronization manager in communication with the one or more ports and the local clock and configured to be enabled and disabled. In some embodiments, when enabled, the synchronization manager may be configured to receive the master clock signal via the one or more ports and transmit an instruction to the local clock to operate at the first frequency.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

Example Slotted Network with Clock Synchronization

Figure 1:
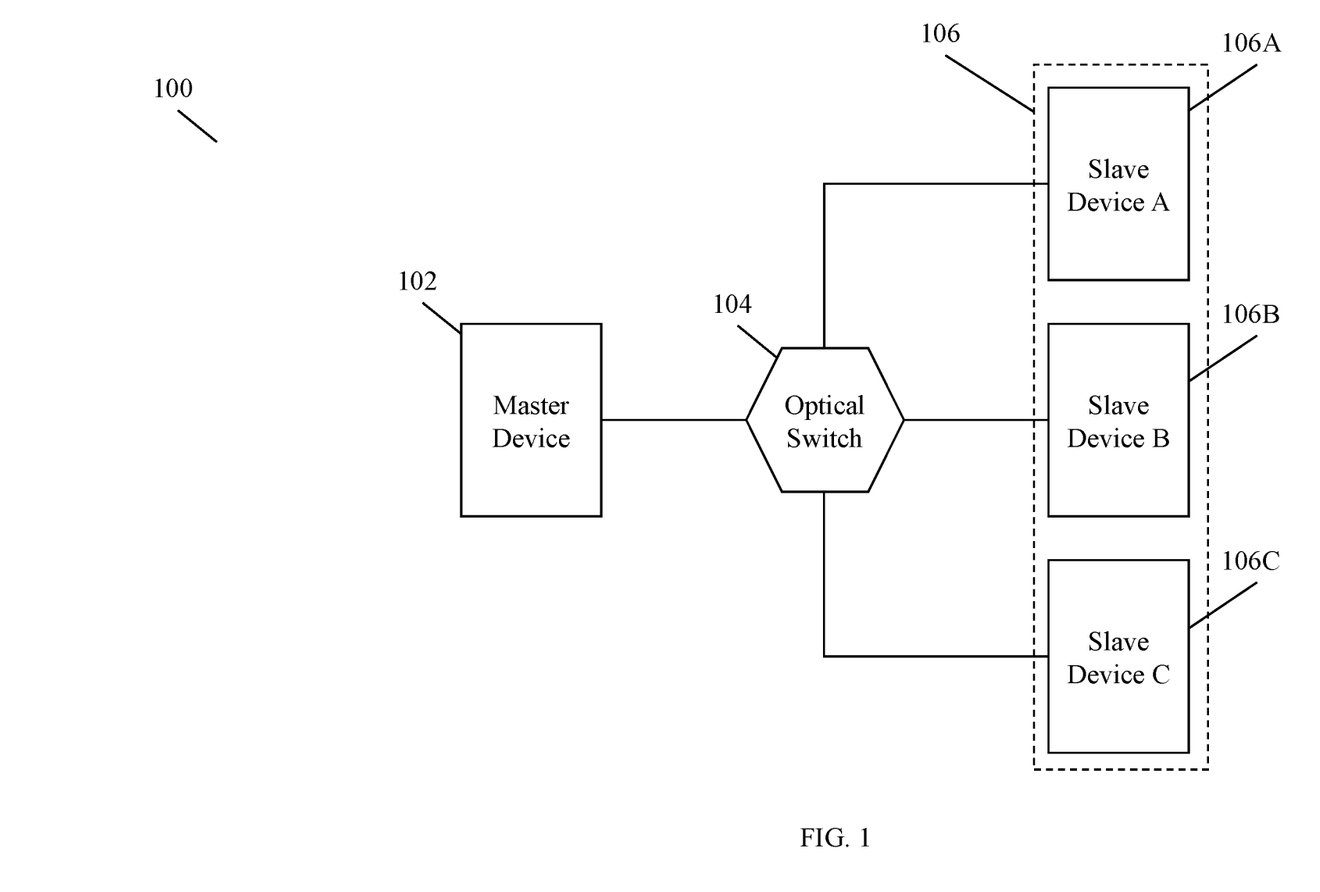
FIG. 1 illustrates an example slotted network for clock synchronization using Synchronous Ethernet in accordance with one or more embodiments of the present disclosure.

With reference to FIGS. 1-3B an example slotted network 100 (e.g., an optically switched network) for clock synchronization using SyncE is provide. In some embodiments, as shown in FIG. 1, the slotted network 100 may include a master device 102 (e.g., a network node). The master device 102 may be in communication with one or more slave devices 106 (e.g., one or more network nodes) via an optical switch 104 (e.g., another network node). As shown, the one or more slave devices 106 may include a first slave device 106A, a second slave device 106B, and a third slave device 106C. Although described hereinafter with reference to a defined number of slave devices 106, the present disclosure contemplates that any number of slave devices 106 may be used based upon the intended application(s)/implementation (s) of the slotted network 100. Additionally, as shown, the master device 102 may be in communication with the one or more slave devices 106 via a single optical switch 104, the present disclosure contemplates that the slotted network 100 may include any number of interconnected or distinct optical switches 104 based upon the intended application(s)/implementation(s) of the slotted network 100. In some embodiments, the master device 102 and/or the one or more slave devices 106 may be any type of electronic or optical device. For example the master device 102 and/or the one or more slave devices 106 may be data processing units, computing processing units, electrical switches, and/or optical switches. As described above, however, the implementations of the present disclosure are directed to slotted networks (e.g., slotted network 100) that, at least in part, leverage optical switches.

Figure 3A:
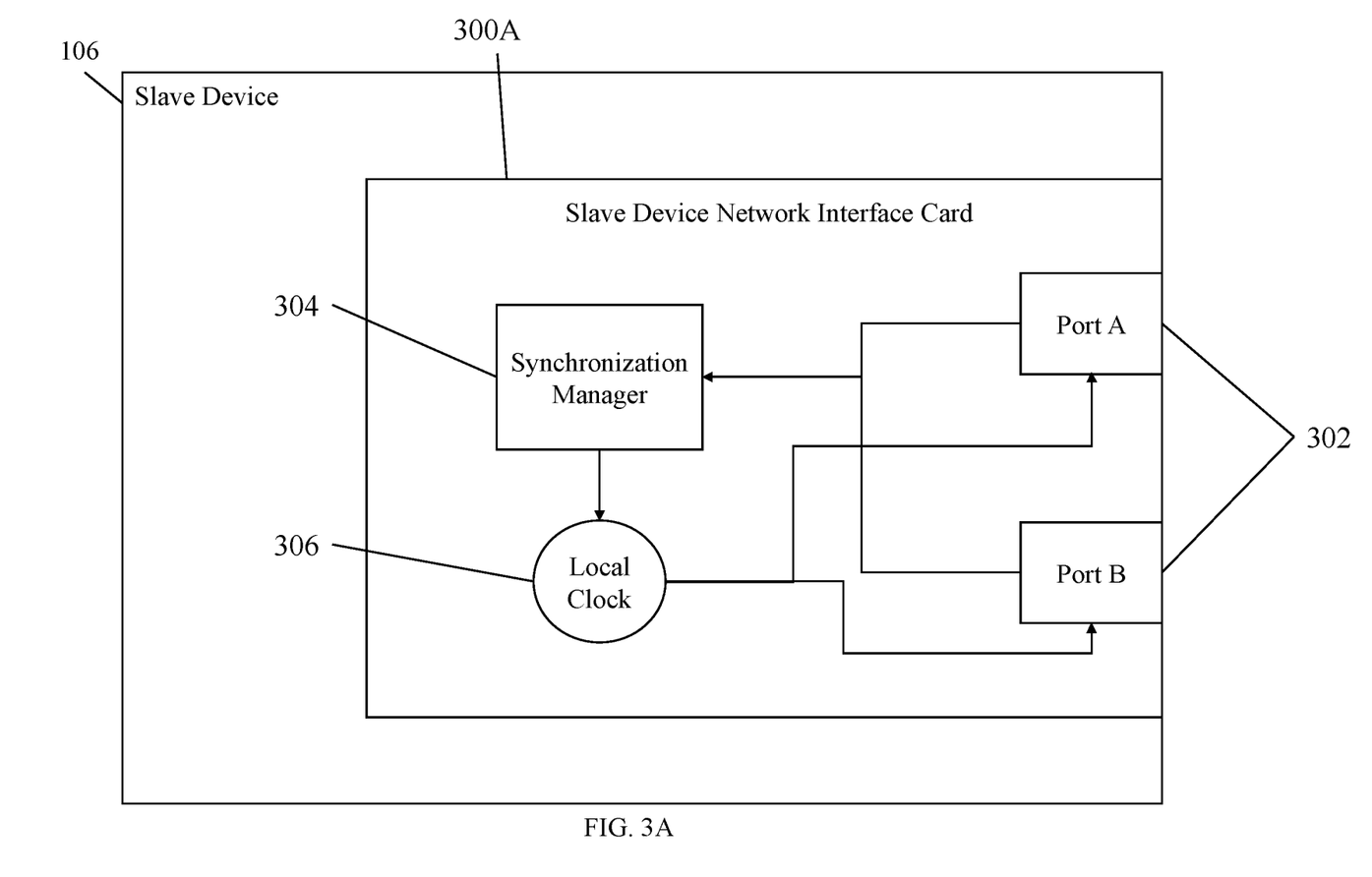
FIG. 3A illustrates a block diagram of an example slave device network interface card in accordance with one or more embodiments of the present disclosure.
Figure 3B:
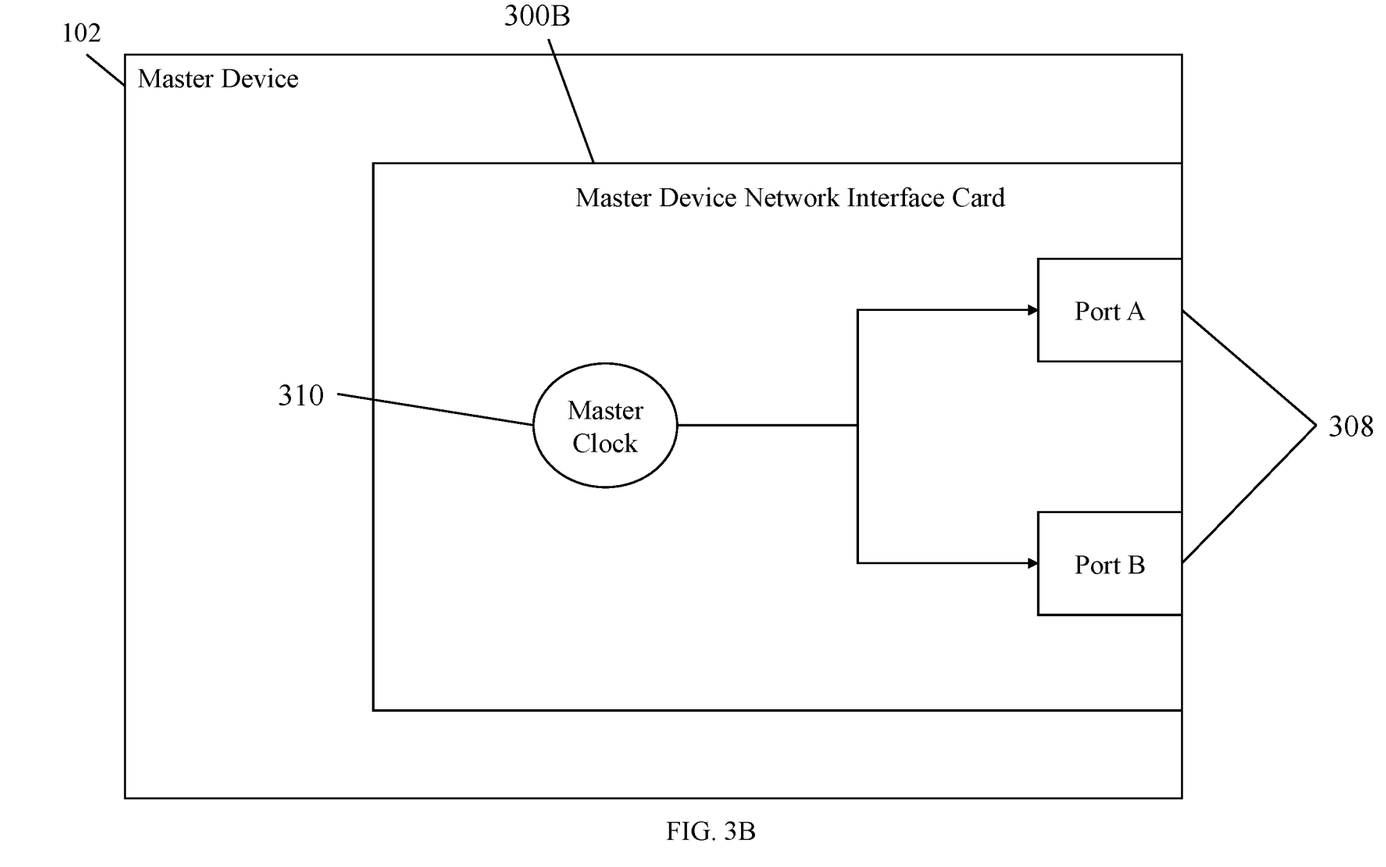
FIG. 3B illustrates a block diagram of an example master device network interface card in accordance with one or more embodiments of the present disclosure.

In some embodiments, the master device 102 may be configured to synchronize the clocks of the one or more slave devices 106 using SyncE. In this regard, the master device 102 may include a network interface card 300B as shown in FIG. 3B. In some embodiments, the network interface card 300B, may include a master clock 310 operating at a first frequency (e.g., a master clock frequency) and one or more ports. In some embodiments, the master clock 310 of the master device network interface card 300B may be configured to generate a master clock signal. In some embodiments, the master device network interface card 300B may include one or more ports 308 that may be configured to transmit the master clock signal from the master clock 310 to the one or more slave devices 106 via the optical switch 104. Although depicted in FIG. 3B as a single component formed as part of the master device 102, the present disclosure contemplates that the components of the network interface card 300B may be embodied as separate and/or distinct components of the master device 102 that together provide the functionality of the network interface card 300B. Additionally, although depicted in FIG. 3B as a part of the master device 102, the present disclosure contemplates that the network interface card 300B may include the entire master device 102.

In some embodiments, the master device 102 may be in communication with the one or more slave devices 106 via the optical switch 104. The one or more slave devices 106 may each include a network interface card 300A which may further include one or more ports 302. For example, the network interface card 300A may include a Port A and a Port B. The one or more ports 302 may be configured to receive the master clock signal from the master device 102 as described above. As shown in FIG. 3A, the network interface card 300A of each of the one or more slave devices 106 may include a local clock 306 in communication with the one or more ports 302. The local clock 306 may be configured to generate a recovered clock signal and may be configured to transmit the recovered clock signal to any network node to which the slave device is connected (e.g., the optical switch's controller, a different slave device 106, etc.). In some embodiments, each of the network interface cards 300A of the one or more slave devices may include a synchronization manager 304 in communication with the one or more ports 302 and the local clock 306. The synchronization manager 304 may be configured to be enabled and disabled in order to synchronize the local clock 306 of the network interface card 300A with the master clock 310 using SyncE. Although depicted in FIG. 3A as a single component that is formed as part of each of the one or more slave devices 106, the present disclosure contemplates that the components of the network interface card 300A may be embodied as separate and/or distinct components of the one or more slave devices 106 that together provide the functionality of the network interface card 300A. Additionally, although depicted in FIG. 3A as a component that is a part of each of the one or more slave devices 106, the present disclosure contemplates that the network interface card 300A may be the entirety of one of the one or more slave devices 106.

Figure 2A:
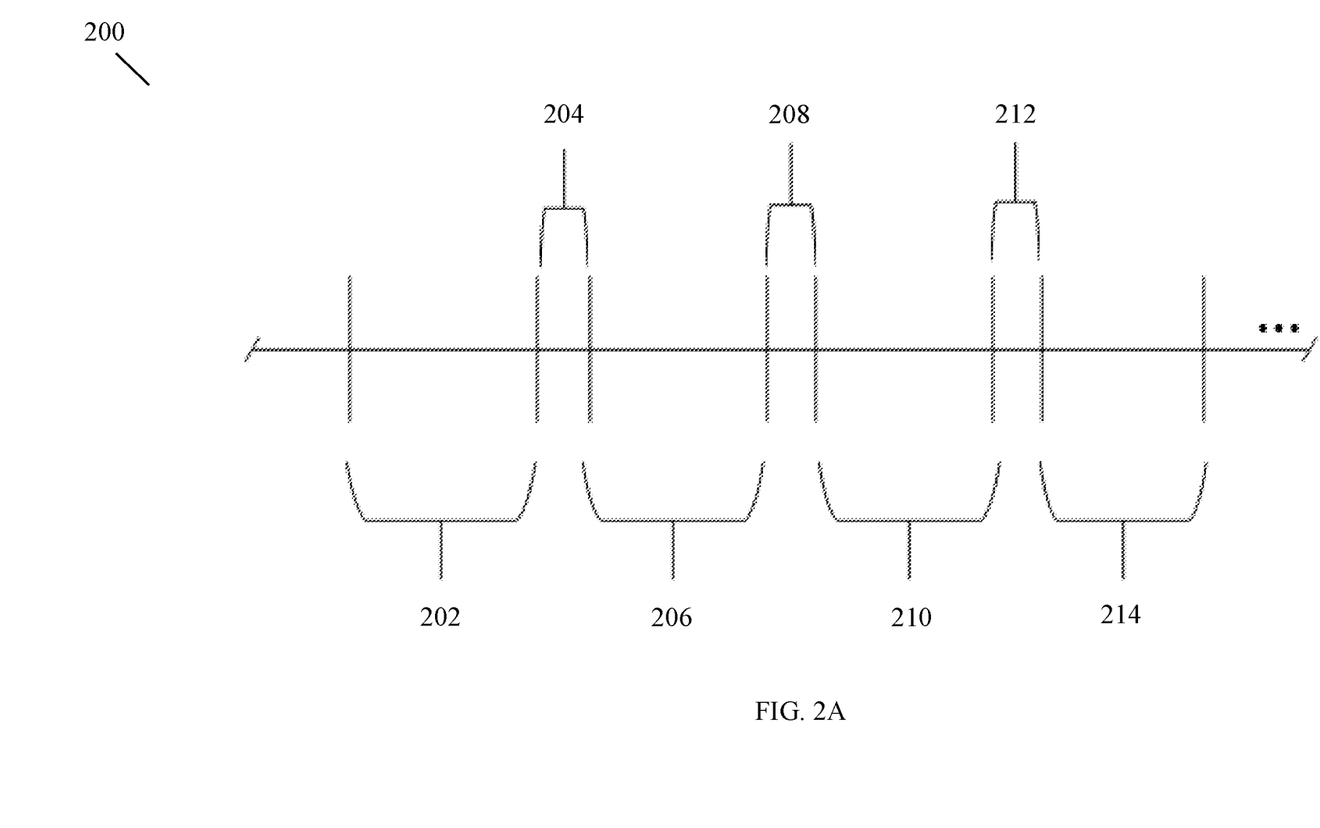
FIG. 2A illustrates an example timeline of synchronization of the slotted network using Synchronous Ethernet in accordance with one or more embodiments of the present disclosure.
Figure 2B:
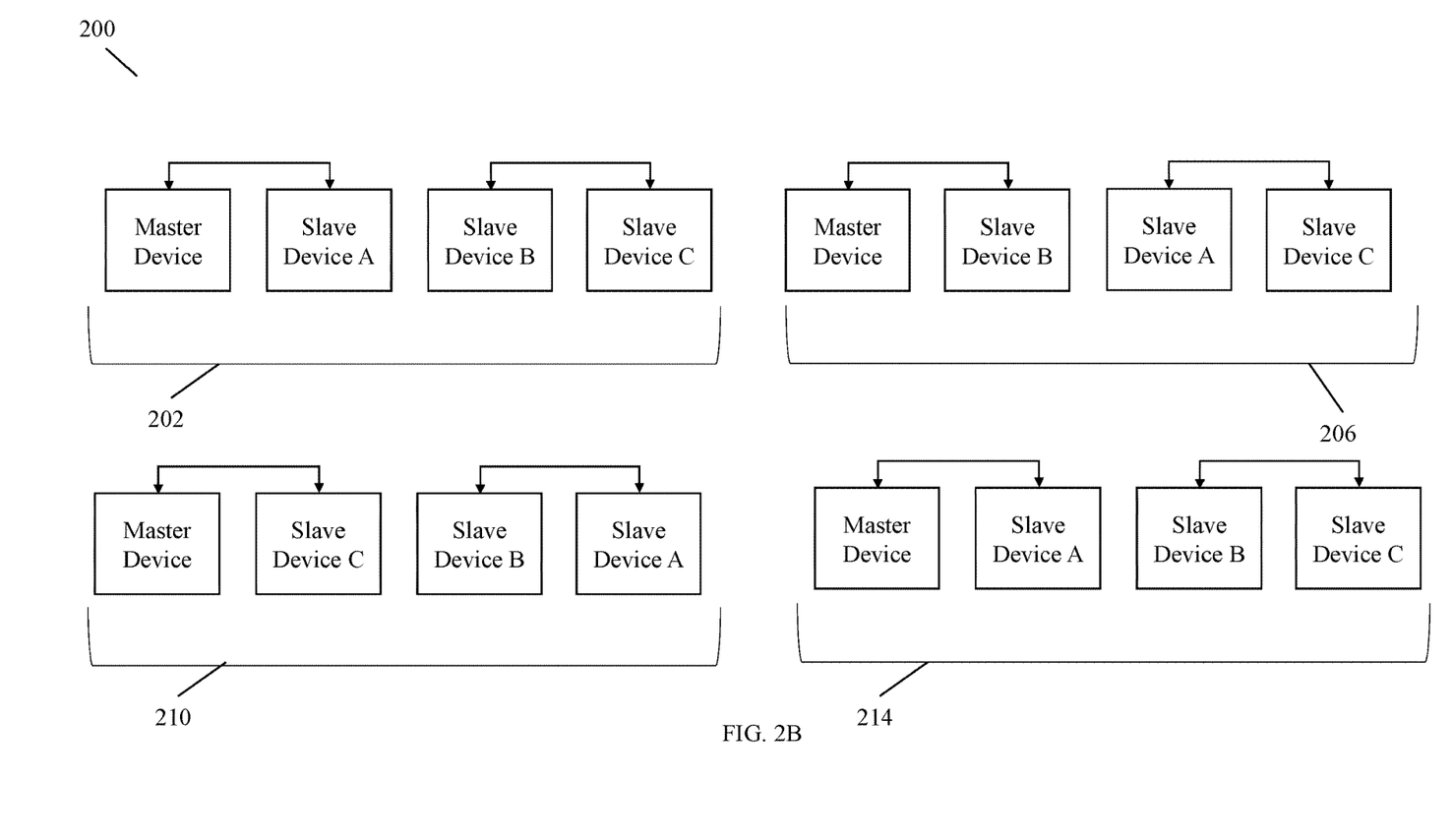
FIG. 2B illustrates example connections of the slotted network in accordance with the timeline of synchronization using Synchronous Ethernet in accordance with one or more embodiments of the present disclosure.

As described above, the master device 102 may be configured to synchronize the clocks of the one or more slave devices 106 of the slotted network using SyncE. As shown in FIG. 2, in a first timeslot 202 of an example timeline 200, the slotted network 100 may be configured such that the master device 102 is in communication with the first slave device 106A via the optical switch 104. During the first timeslot 202, the synchronization manager 304 of the first slave device 106A may be enabled. When the synchronization manager 304 is enabled, the synchronization manager 304 may receive the master clock signal via the one or more ports 302. In some embodiments, the synchronization manager 304 may instruct the local clock 306 to operate at the frequency of the master clock 310. For example, if the master clock 310 is operating at a first frequency and the local clock 306 is operating at a second frequency, the synchronization manager 304 may transmit an instruction to the local clock 306 to operate at the first frequency. In this way, the frequency of the local clock 306 of the first slave device 106A may be synchronized to the master clock frequency of the master clock 310.

In some embodiments, during the first timeslot 202, the second slave device 106B may be in communication with the third slave device 106C via the optical switch 104. During the first timeslot 202, the second slave device 106B may generate a recovered clock signal and transmit the recovered clock signal to the third slave device 106C. Additionally or alternatively, the third slave device 106C may generate a recovered clock signal and transmit the recovered clock signal to the second slave device 106B. To ensure proper operation of these components, the synchronization manager 304 of the second slave device 106B and the synchronization manager of the third slave device 106C may be disabled. As such, the synchronization manager 304 of the second slave device 106B may disregard the recovered clock signal received from the third slave device 106C (e.g., not instruct the local clock 306 of the second slave device 106B to operate at the frequency of the recovered clock signal received from the third slave device 106C), and the synchronization manager 304 of the third slave device 106C may disregard the recovered clock signal received from the second slave device 106B (e.g., not instruct the local clock 306 of the third slave device 106C to operate at the frequency of the recovered clock signal received from the second slave device 106B). In this way, the second slave device 106B and the third slave device 106C may be synchronized to the frequency of the master clock without undue influence by other local clocks operating at a different frequency (e.g., not the master clock frequency or first frequency).

In some embodiments, in a second timeslot 206, the slotted network 100 may be configured such that the master device 102 is in communication with the second slave device 106B via the optical switch 104. During the second timeslot 206, the synchronization manager 304 of the second slave device 106B may be enabled. When the synchronization manager 304 is enabled, the synchronization manager 304 may receive the master clock signal via the one or more ports 302. In some embodiments, the synchronization manager 304 may instruct the local clock 306 to operate at the frequency of the master clock 310. For example, if the master clock 310 is operating at a first frequency and the local clock 306 is operating at a second frequency, the synchronization manager 304 transmits an instruction to the local clock 306 to operate at the first frequency. In this way, the frequency of the local clock 306 of the second slave device 106B may similarly be synchronized to the master clock frequency of the master clock 310.

In some embodiments, during the second timeslot 206, the first slave device 106A may be in communication with the third slave device 106C via the optical switch 104. During the second timeslot 206, the first slave device 106A may generate a recovered clock signal and transmit the recovered clock signal to the third slave device 106C, and the third slave device 106C may generate a recovered clock signal and transmit it to the first slave device 106A. Similar to the first time slot 202 above, the synchronization manager 304 of the first slave device 106A and the synchronization manager of the third slave device 106C may be disabled. As such, the synchronization manager 304 of the first slave device 106A may disregard the recovered clock signal received from the third slave device 106C (e.g., not instruct the local clock 306 of the first slave device 106A to operate at the frequency of the recovered clock signal received from the third slave device 106C), and the synchronization manager 304 of the third slave device 106C may disregard the recovered clock signal received from the first slave device 106A (e.g., not instruct the local clock 306 of the third slave device 106C to operate at the frequency of the recovered clock signal received from the first slave device 106A). In this way, the first slave device 106A and the third slave device 106C may remain synchronized to the frequency of the master clock without undue influence by other local clocks operating at a different frequency (e.g., not the master clock frequency or first frequency).

In a third timeslot 210 of the timeline 200, the slotted network 100 may be configured such that the master device 102 is in communication with the third slave device 106C via the optical switch 104. During the third timeslot 210, the synchronization manager 304 of the third slave device 106C may be enabled. When the synchronization manager 304 is enabled, the synchronization manager 304 may receive the master clock signal via the one or more ports 302. In some embodiments, the synchronization manager 304 may instruct the local clock 306 to operate at the frequency of the master clock 310. For example, if the master clock 310 is operating at a first frequency and the local clock 306 is operating at a second frequency, the synchronization manager 304 transmits an instruction to the local clock 306 to operate at the first frequency. In this way, the frequency of the local clock 306 of the third slave device 106C may be synchronized to the master clock frequency of the master clock 310.

In some embodiments, during the third timeslot 210, the second slave device 106B may be in communication with the first slave device 106A via the optical switch 104. During the third timeslot 210, the second slave device 106B may generate a local clock a signal and transmit it to the first slave device 106A, and the first slave device 106A may generate a recovered clock signal and transmit it to the second slave device 106B. In response, the synchronization manager 304 of the second slave device 106B and the synchronization manager of the first slave device 106A may be disabled. As such, the synchronization manager 304 of the second slave device 106B may disregard the recovered clock signal received from the first slave device 106A (e.g., not instruct the local clock 306 of the second slave device 106B to operate at the frequency of the recovered clock signal received from the first slave device 106A), and the synchronization manager 304 of first slave device 106A may disregard the recovered clock signal received from the second slave device 106B (e.g., not instruct the local clock 306 of the first slave device 106A to operate at the frequency of the recovered clock signal received from the second slave device 106B). In this way, the second slave device 106B and the first slave device 106A may remain synchronized to the frequency of the master clock without undue influence by other external (e.g., any clock other than a local clock) clocks operating at a different frequency (e.g., not the master clock frequency or first frequency).

In some embodiments, in a fourth timeslot 214 of the timeline 200, the slotted network 100 may be configured such that the master device 102 is again in communication with the first slave device 106A via the optical switch 104. In some embodiments, during the fourth timeslot 214, the second slave device 106B may be again in communication with the third slave device 106C via the optical switch 104. As such, the slotted network 100 may be configured such that the master device 102 and each of the one or more slave devices 106 continue to be connected to one another periodically in accordance with the pattern described above and/or another equivalent schedule. In other words, in some embodiments, the slotted network 100 may employ a determined schedule in which a particle slave device 106 is connected to the master device 102 at particular intervals, and the appropriate enabling/disabling operations described herein may occur in response to this determined schedule. In some embodiments, the slotted network 100 may be configured such that the master device 102 and the one or more slave devices 106 continue to be periodically connected to one another in accordance with another different pattern. The slotted network 100 may, for example be configured such that the master device 102 and the one or more slave devices 106 continue to be connected to each other randomly based on the application(s)/implementation(s) of the slotted network 100. In other words, the techniques described herein may be applicable to any schedule or pattern implemented by the slotted network 100. Additionally or alternatively, the embodiments described herein may leverage packet-based signaling techniques in which linked or otherwise connected devices transmit packets between one another, and each of the connected devices determine whether or not synchronization between these connected devices is required. Still further, in some instances, the embodiments described herein may leverage a scheduling device or controller (not shown) that generates and transmits notification(s) to particular slave devices 106 (e.g., via a control plane interface or otherwise) indicative of when to enable the synchronization manager 304.

In some embodiments, the length of the timeslots 202, 206, 210, and/or 214 may be based upon the intended application(s)/implementations(s) of the slotted network 100. In some embodiments, the length of each of the timeslots 202, 206, 210, and/or 214 may be the same. For example, in some embodiments, the length of the timeslots 202, 206, 210, and 214 may be approximately 0.9 ms. In other embodiments, the length of each of the timeslots 202, 206, 210, and/or 214 may be different. For example, the timeslots 202 and 214 may be approximately 0.5 ms while the timeslots 206 and 210 may be approximately 0.75 ms.

In some embodiments, in between some or all of the timeslots 202, 206, 210, 214 a guard band may exist. For example, between the first timeslot 202 and the second timeslot 206 there may be a first guard band 204, between the second timeslot 206 and the third timeslot 210 there may be a second guard band 208, and/or between the third timeslot 210 and the fourth timeslot 214 there may be a third guard band 212. In some embodiments, each guard band may enable the optical switch 104 to be reconfigured so that different network devices (e.g., nodes) may be connected. For example, the second guard band 208 may provide time for the first slave device 106A to connect to the second slave device 106B and for the master device 102 to connect to the third slave device 106C. In some embodiments, the length of time associated with each of the guard bands may be less than the length of time associated with the timeslots described above. For example, the length of the first timeslot 202 may be approximately 0.9 ms and the length of the first guard band 204 may be approximately 0.1 ms. As would be evident in light of the nature of the first guard band 204, the second guard band 208, and the third guard band 212, during the time associated with these guard band(s), the synchronization manager 304 may be disabled in that the synchronization manager 304 may lack a particular link partner, and, thus, lack a frequency source with which to synchronize.

Example Synchronization Manager

Figure 4:
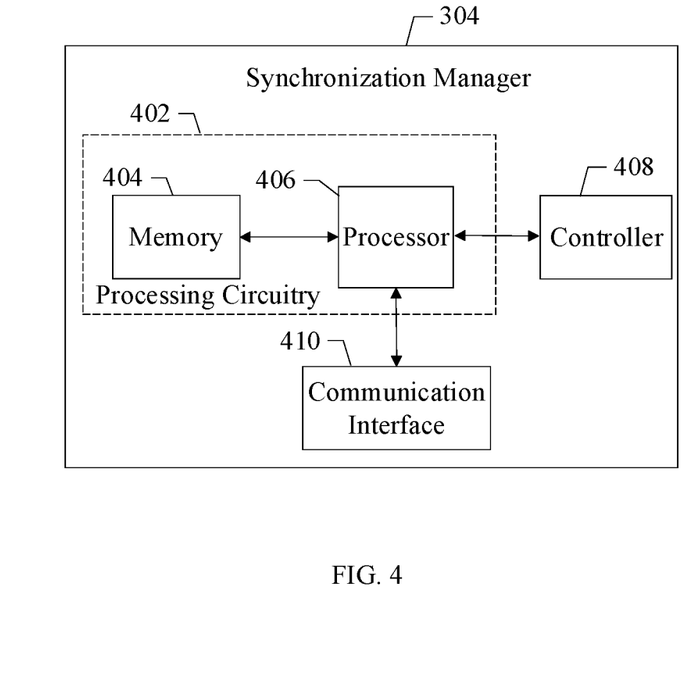
FIG. 4 illustrates a block diagram of an example synchronization manager in accordance with one or more embodiments of the present disclosure.

With reference to FIG. 4, a block diagram of the synchronization manager 304 is illustrated in accordance with some example embodiments. However, it should be noted that the components, devices or elements illustrated in and described with respect to FIG. 4 below may not be mandatory and thus one or more may be omitted in certain embodiments. Additionally, some embodiments may include further or different components, devices or elements beyond those illustrated in and described with respect to FIG. 4.

The synchronization manager 304 may include or otherwise be in communication with processing circuitry 402 that is configurable to perform actions in accordance with one or more example embodiments disclosed herein. In this regard, the processing circuitry 402 may be configured to perform and/or control performance of one or more functionalities of the synchronization manager 304 in accordance with various example embodiments, and thus may provide means for performing functionalities of the synchronization manager 304 in accordance with various example embodiments. The processing circuitry 402 may be configured to perform data processing, application execution and/or other processing and management services according to one or more example embodiments. In some embodiments, the synchronization manager 304 or a portion(s) or component(s) thereof, such as the processing circuitry 402, may be embodied as or comprise a chip or chip set. In other words, the synchronization manager 304 or the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The synchronization manager 304 or the processing circuitry 402 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 402 may include a processor 406 and, in some embodiments, such as that illustrated in FIG. 4, may further include memory 404. The processing circuitry 402 may be in communication with or otherwise control a communication interface 410 and/or a controller 408. As such, the processing circuitry 402 may be embodied as a circuit chip (e.g., an integrated circuit chip) configured (e.g., with hardware, software or a combination of hardware and software) to perform operations described herein.

The processor 406 may be embodied in a number of different ways. For example, the processor 406 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 406 may comprise a plurality of processors. The plurality of processors may be in operative communication with each other and may be collectively configured to perform one or more functionalities of the synchronization manager 304 as described herein. The plurality of processors may be embodied on a single computing device or distributed across a plurality of computing devices collectively configured to function as the synchronization manager 304. In some example embodiments, the processor 406 may be configured to execute instructions stored in the memory 404 or otherwise accessible to the processor 406. As such, whether configured by hardware or by a combination of hardware and software, the processor 406 may represent an entity (e.g., physically embodied in circuitry — in the form of processing circuitry 402) capable of performing operations according to embodiments of the present invention while configured accordingly. Thus, for example, when the processor 406 is embodied as an ASIC, FPGA or the like, the processor 406 may be specifically configured hardware for conducting the operations described herein. Alternatively, as another example, when the processor 406 is embodied as an executor of software instructions, the instructions may specifically configure the processor 406 to perform one or more operations described herein.

In some example embodiments, the memory 404 may include one or more non-transitory memory devices such as, for example, volatile and/or non-volatile memory that may be either fixed or removable. In this regard, the memory 404 may comprise a non-transitory computer-readable storage medium. It will be appreciated that while the memory 404 is illustrated as a single memory, the memory 404 may comprise a plurality of memories. The plurality of memories may be embodied on a single computing device or may be distributed across a plurality of computing devices collectively configured to function as the synchronization manager 304. The memory 404 may be configured to store information, data, applications, instructions and/or the like for enabling the synchronization manager 304 to carry out various functions in accordance with one or more example embodiments. For example, the memory 404 may be configured to buffer input data for processing by the processor 406. Additionally or alternatively, the memory 404 may be configured to store instructions for execution by the processor 406. As yet another alternative, the memory 404 may include one or more databases that may store a variety of files, contents or data sets. Among the contents of the memory 404, applications may be stored for execution by the processor 406 in order to carry out the functionality associated with each respective application. In some cases, the memory 404 may be in communication with one or more of the processor 406, communication interface 410, or the controller 408 via a bus(es) for passing information among components of the synchronization manager 304.

In some example embodiments, the synchronization manager 304 may further include a communication interface 410. In some cases, the communication interface 410 may be any means such as a device or circuitry embodied in either hardware, or a combination of hardware and software that is configured to receive and/or transmit data from/to a network and/or any other device or circuitry in communication with the processing circuitry 402. By way of example, the communication interface 410 may be configured to enable the synchronization manager 304 to communicate with the one or more ports 302 and/or the local clock 306. Accordingly, the communication interface 410 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the synchronization manager 304 may include or otherwise control a controller 408. As such, the controller 408 may be embodied as various means, such as circuitry, hardware, a computer program product comprising computer readable program instructions stored on a computer readable medium (for example, the memory 404) and executed by a processing device (for example, the processor 406), or some combination thereof. The controller 408 may be capable of communication with one or more of the memory 404 or communication interface 410 to access, receive, and/or send data as may be needed to perform one or more of the functionalities of the controller 408 as described herein.

Example Method of Synchronization

Figure 5:
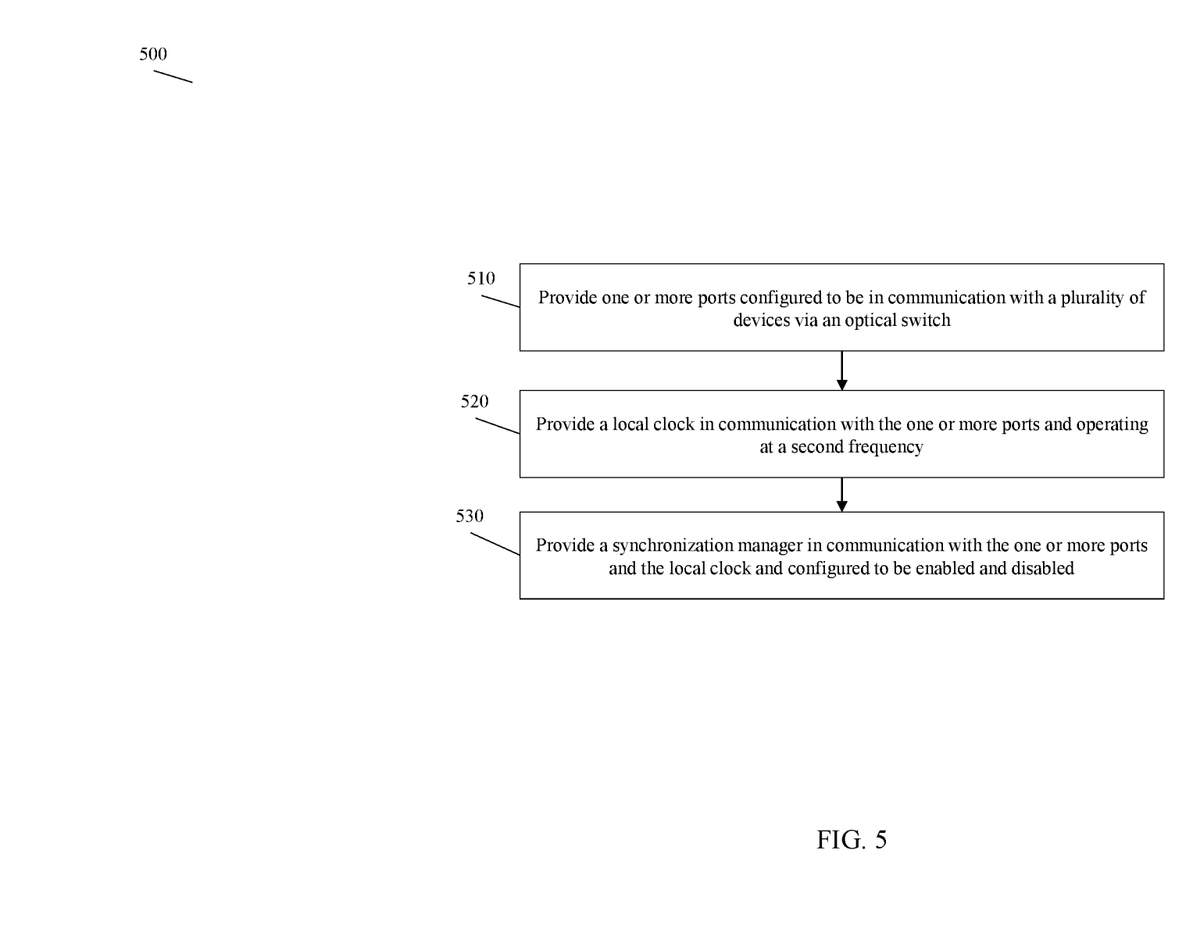
FIG. 5 illustrates a flowchart of an example method for performing synchronization of a slotted network using Synchronous Ethernet in accordance with one or more embodiments of the present disclosure.

Referring now to FIG. 5, a flowchart is illustrated according to an example method for synchronizing a slotted network of optical switches to a master clock using SyncE. In some embodiments, FIG. 5 illustrates operations that may be performed with the assistance of the one of the one or more slave devices 106. In this regard performance of the operations may invoke one or more of the synchronization manager 304, one or more ports 302, and/or the local clock 306.

As shown in block 510, the method may include providing one or more ports configured to be in communication with a plurality of devices via an optical switch. In this regard, the one or more ports are configured to receive a master clock signal having a first frequency from a first device of the plurality of devices. For example, the one or more ports 302 of the first slave device 106A may be configured to receive the master signal having the master clock frequency from the master device 102 via the optical switch 104 as described above with reference to FIGS. 1-3B.

As shown in block 520, the method may include providing a local clock in communication with the one or more ports and operating at a second frequency. For example, the one or more ports 302 of the first slave device 106A may be in communication with the local clock 306 of the first slave device 106A. The local clock 306 of the first slave device 106A may be operating at a local clock frequency.

As shown in block 530, the method may include providing a synchronization manager in communication with the one or more ports and the local clock and configured to be enabled and disabled. When enabled, the synchronization manager 304 may receive the master clock signal via the one or more ports 302. Upon receiving the master clock signal, the synchronization manager 304 may instruct the local clock 306 to operate at the frequency of the master clock 310. For example, if the master clock 310 is operating at a first frequency and the local clock 306 is operating at a second frequency, the synchronization manager 304 transmits an instruction to the local clock 306 to operate at the first frequency. In this way, the frequency of the local clock 306 of the first slave device 106A may be synchronized to the master clock frequency of the master clock 310.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A network device comprising:
one or more ports configured to be in communication with a plurality of devices via an optical switch, wherein the one or more ports are configured to receive a master clock signal having a first frequency from a first device of the plurality of devices;
a local clock in communication with the one or more ports and operating at a second frequency different from the first frequency; and
a synchronization manager in communication with the one or more ports and the local clock and configured to be enabled and disabled,
wherein, when enabled, the synchronization manager is configured to:
receive the master clock signal via the one or more ports; and
transmit an instruction to the local clock to set the local clock to the first frequency.

2. The network device of claim 1, wherein the synchronization manager is configured to be enabled during a first time period.

3. The network device of claim 1, wherein the synchronization manager is configured to be disabled during a second time period.

4. The network device of claim 3, wherein during the second time period the local clock is configured to transmit a recovered clock signal to a second device of the plurality of devices via the one or more ports.

5. The network device of claim 4, wherein the local clock operates at the first frequency during the second time period.

6. The network device of claim 4, wherein the master clock signal and the recovered clock signal are transmitted in accordance with a Synchronous Ethernet standard.

7. The network device of claim 3, wherein the synchronization manager is configured to be enabled during a third time period.

8. A method comprising:
providing one or more ports configured to be in communication with a plurality of devices via an optical switch, wherein the one or more ports are configured to receive a master clock signal having a first frequency from a first device of the plurality of devices;
providing a local clock in communication with the one or more ports and operating at a second frequency different from the first frequency;
providing a synchronization manager in communication with the one or more ports and the local clock and configured to be enabled and disabled,
wherein, when enabled, the synchronization manager is configured to:

receive the master clock signal via the one or more ports; and transmit an instruction to the local clock to set the local clock to the first frequency.

9. The method of claim 8, wherein the synchronization manager is configured to be enabled during a first time period.

10. The method of claim 8, wherein the synchronization manager is configured to be disabled during a second time period.

11. The method of claim 10, wherein during the second time period the local clock is configured to transmit a recovered clock signal to a second device of the plurality of devices via the one or more ports.

12. The method of claim 11, wherein the local clock operates at the first frequency during the second time period.

13. The method of claim 11, wherein the master clock signal and the recovered clock signal are transmitted in accordance with a Synchronous Ethernet standard.

14. The method of claim 11, wherein the one or more ports are connected to the plurality of devices via the optical switch.

15. The method of claim 10, wherein the synchronization manager is configured to be enabled during a third time period.

16. A slotted network comprising:
a master device comprising a master clock operating at a first frequency and configured to generate a master clock signal; and
a first slave device in communication with the master device via an optical switch, the first slave device comprising:
one or more ports configured to receive the master clock signal from the master device;
a local clock in communication with the one or more ports and operating at a second frequency different from the first frequency; and
a synchronization manager in communication with the one or more ports and the local clock and configured to be enabled and disabled,
wherein when enabled the synchronization manager is configured to:
receive the master clock signal via the one or more ports; and
transmit an instruction to the local clock to set the local clock to the first frequency.

17. The slotted network of claim 16, wherein the synchronization manager is configured to be enabled during a first time period.

18. The slotted network of claim 17, wherein the synchronization manager is configured to be disabled during a second time period.

19. The slotted network of claim 18, wherein during the second time period the local clock is configured to transmit a recovered clock signal to a second slave device via the one or more ports.

20. The slotted network of claim 19, wherein the local clock is operating at the first frequency during the second time period.

* * * * *

UNITED STATES PATENT AND TRADEMARK OFFICE
CERTIFICATE OF CORRECTION

PATENT NO. : 12,028,661 B2
APPLICATION NO. : 17/869932
DATED : July 2, 2024
INVENTOR(S) : Ioannis Giannis Patronas et al.

Page 1 of 1

It is certified that error appears in the above-identified patent and that said Letters Patent is hereby corrected as shown below:

On the Title Page

Item (72) Column 1 Lines 3-4 & Lines 4-5:
1) Please change the residence information for inventor Wojciech Wasko to Mlynek (PL)
2) Please change the residence information for inventor Paraskevas Bakopoulos to Ilion (GR)

Signed and Sealed this
Tenth Day of September, 2024

Katherine Kelly Vidal
*Director of the United States Patent and Trademark Office*